United States Patent
Pu et al.

(10) Patent No.: US 11,530,787 B2
(45) Date of Patent: Dec. 20, 2022

(54) COLLAPSE PREVENTING LAMPS

(71) Applicant: CH LIGHTING TECHNOLOGY CO., LTD., Shaoxing (CN)

(72) Inventors: Jizhong Pu, Shaoxing (CN); Jiangfeng Jiang, Shaoxing (CN)

(73) Assignee: CH LIGHTING TECHNOLOGY CO., LTD., Shaoxing (CN)

(*) Notice: Subject to any disclaimer, the term of this patent is extended or adjusted under 35 U.S.C. 154(b) by 0 days.

(21) Appl. No.: 17/359,654

(22) Filed: Jun. 28, 2021

(65) Prior Publication Data
US 2021/0325012 A1 Oct. 21, 2021

Related U.S. Application Data

(63) Continuation of application No. PCT/CN2020/115319, filed on Sep. 15, 2020.

(30) Foreign Application Priority Data

Oct. 21, 2019 (CN) .......................... 201910999048.0

(51) Int. Cl.
*F21S 8/04* (2006.01)
*F21V 5/00* (2018.01)
(Continued)

(52) U.S. Cl.
CPC ................ *F21S 8/043* (2013.01); *F21V 5/00* (2013.01); *F21V 17/104* (2013.01); *F21V 17/12* (2013.01);
(Continued)

(58) Field of Classification Search
CPC .... F21S 8/043; F21S 8/026; F21S 8/04; F21S 8/046; F21V 21/042; F21V 21/044;
(Continued)

(56) References Cited

U.S. PATENT DOCUMENTS 2,791,681 A * 5/1957 Evans ..................... F21V 31/00
292/60
2,873,358 A * 2/1959 Dunker .................... F21S 8/02
362/267
(Continued)

FOREIGN PATENT DOCUMENTS

| CN | 102077020 A | 5/2011 |
| CN | 206951875 U | 6/2019 |
| JP | 2018014281 A | 1/2018 |

OTHER PUBLICATIONS

International Search Report issued in corresponding International application No. PCT/CN2020/115319, dated Dec. 14, 2020.
(Continued)

*Primary Examiner* — Jong-Suk (James) Lee
*Assistant Examiner* — James M Endo

(57) ABSTRACT

A collapse preventing lamp including a lamp panel and a lamp frame, wherein the lamp panel as a light source is installed in the lamp frame, and wherein a gap is defined between at least one side edge of the lamp panel and an edge of the lamp frame; and a baffle for shielding the gap is provided which is overlapped on the lamp frame, and the baffle is provided with an anti-collapse member for supporting a corresponding side edge of the lamp panel.

18 Claims, 9 Drawing Sheets

(51) Int. Cl.
  *F21V 17/10* (2006.01)
  *F21V 17/12* (2006.01)
  *F21V 23/00* (2015.01)
  *F21Y 115/10* (2016.01)

(52) U.S. Cl.
  CPC ......... *F21V 23/007* (2013.01); *F21Y 2115/10* (2016.08)

(58) Field of Classification Search
  CPC .... F21V 21/045; F21V 21/046; F21V 21/048; F21V 21/049; F21V 17/14; F21V 17/18; F21V 17/164; F21V 17/166
  See application file for complete search history.

(56) References Cited

U.S. PATENT DOCUMENTS

| | | | | |
|---|---|---|---|---|
| 9,069,106 | B1* | 6/2015 | Blessitt | F21S 8/04 |
| 9,671,095 | B1* | 6/2017 | Sorensen | F21S 8/026 |
| 2001/0006463 | A1* | 7/2001 | Fischer | F21V 23/02 |
| | | | | 362/374 |
| 2006/0152921 | A1* | 7/2006 | Welker | F21V 17/107 |
| | | | | 362/147 |
| 2007/0086198 | A1* | 4/2007 | Wilson | F21V 3/00 |
| | | | | 362/382 |
| 2009/0207603 | A1* | 8/2009 | Lydecker | F21V 23/026 |
| | | | | 362/217.05 |
| 2011/0058358 | A1* | 3/2011 | Soo | F21V 29/70 |
| | | | | 362/147 |
| 2012/0230019 | A1* | 9/2012 | Peifer | F21V 21/048 |
| | | | | 362/147 |
| 2013/0027915 | A1* | 1/2013 | Caferro | F21V 17/107 |
| | | | | 362/147 |
| 2013/0176716 | A1* | 7/2013 | Pratt | F21V 23/009 |
| | | | | 362/217.05 |
| 2014/0071665 | A1* | 3/2014 | Huang | F21V 23/008 |
| | | | | 362/218 |
| 2015/0085476 | A1* | 3/2015 | Mandy | F21V 29/773 |
| | | | | 362/147 |
| 2015/0146438 | A1* | 5/2015 | Rauer-Hans | F21V 17/107 |
| | | | | 362/374 |
| 2015/0267873 | A1* | 9/2015 | Price | F21S 8/026 |
| | | | | 362/432 |
| 2015/0276125 | A1* | 10/2015 | Pratt | F21V 5/048 |
| | | | | 362/326 |
| 2015/0338084 | A1* | 11/2015 | Ryder | F21V 21/30 |
| | | | | 362/365 |
| 2016/0084447 | A1* | 3/2016 | Scribante | H05B 45/10 |
| | | | | 362/217.1 |
| 2017/0299801 | A1* | 10/2017 | Kim | G02B 6/0083 |
| 2017/0356625 | A1* | 12/2017 | Sorensen | F21V 17/18 |
| 2017/0356632 | A1* | 12/2017 | Rao | F21V 21/046 |
| 2018/0010746 | A1* | 1/2018 | Li | F21S 8/026 |
| 2018/0031212 | A1* | 2/2018 | Nguyen | G02B 6/0091 |
| 2018/0156399 | A1* | 6/2018 | Sorensen | F21S 8/026 |
| 2018/0231239 | A1* | 8/2018 | Fang | F21V 21/041 |
| 2018/0259161 | A1* | 9/2018 | Nijkamp | F21V 17/16 |
| 2019/0032873 | A1* | 1/2019 | Van Gompel | F21V 19/003 |
| 2019/0032902 | A1* | 1/2019 | Kim | F21V 21/04 |

OTHER PUBLICATIONS

Written Opinion of the International Search Authority in corresponding International application No. PCT/CN2020/115319.

* cited by examiner

COLLAPSE PREVENTING LAMPS

TECHNICAL FIELD

The present application relates to the field of lighting technology, in particular, to a collapse preventing lamp.

BACKGROUND

LED panel lamp is an advanced indoor lighting lamp, the outer frame of which is made of aluminum alloy by anodizing, and the light source of which is LED. This lamp is generally elegant in design, lofty and luxurious, with good lighting effect.

The structure of the LED panel lamp includes a bracket, a frame and a baseplate, which can be embedded in the surfaces of the ceiling, the wall and the mounting body, and the lamp can also be mounted and fixed by accessories such as suspension wire, or mounting bracket, or the like.

In the existing lamps, the size of the LED panel lamp should be generally adapted to the installation space in the bracket, and the LED lamp of a smaller size cannot be used for replacement, resulting in a poor versatility.

SUMMARY

A collapse preventing lamp, comprising a lamp panel and a lamp frame, wherein the lamp panel as a light source is installed in the lamp frame, and wherein a gap is defined between at least one side edge of the lamp panel and an edge of the lamp frame; and a baffle for shielding the gap is provided which is overlapped on the lamp frame, and the baffle is provided with an anti-collapse member for supporting a corresponding side edge of the lamp panel.

Several alternatives are also provided below, but are not to be taken as additional limitations to the overall technical solution described above, merely as a further addition or preference. Without technical or logical contradiction, the alternatives may be combined with the above overall technical solution, individually or in multiple.

Optionally, the lamp panel has two opposite first side edges and two opposite second side edges, wherein the gap is located between the first side edge and the edge of the lamp frame or between the second side and the edge of the lamp frame.

Optionally, the lamp panel has the two first side edges located in a longitudinal direction and the two second side edges located in a width direction, and wherein the gap is located between at least one of the first side edges and the edge of the lamp frame.

Optionally, the lamp frame comprises two lateral supports arranged opposite to each other and two frame edges arranged opposite to each other; and wherein
the side edge of the lamp panel and the lateral support are
 provided with a locking mechanism for fixing the lamp panel; and
the gap is located between at least one of the frame edges and the side edge of the lamp panel.

Optionally, the number of the locking mechanism is at least one, and the locking mechanisms are spaced between the lamp panel and the lamp frame.

Optionally, the locking mechanism comprises:
a stud mounted at the side edge of the lamp panel, wherein an end of the stud facing away from the lamp panel is provided with a stopping cap; and
a fixing hole opened in the lateral support, wherein the fixing hole extends in a straight line, and one end of the fixing hole is enlarged in diameter to form an insertion end for the stopping cap passing through.

Optionally, the locking mechanism comprises:
a locking hole defined in the lateral support; and
a locking piece rotatably mounted at the side edge of the lamp panel, wherein the locking piece has a length direction, and the locking piece is mounted at a middle thereof in the length direction at the side edge of the lamp panel through a rotating shaft, and wherein one end of the locking piece in the length direction is provided with a hook extending into the locking hole to be hooked, and the other end is provided with a toggling piece for rotating the locking piece.

Optionally, there are two groups of bar-shaped holes and locking holes, which are respectively arranged at two ends of the lateral support.

Optionally, the lamp frame comprises two lateral supports arranged opposite to each other, and two frame edges arranged opposite to each other; and wherein
the two frame edges correspond to two first side edges of the lamp panel in a longitudinal direction in position, and the two lateral supports correspond to two second side edges of the lamp panel in a width direction in position; and
the gap is located between the first side edge and the frame edge on the same side therewith.

Optionally, both ends of the lateral support are provided with overlapping portions extending to the first side edge, and two ends of the baffle are respectively overlapped on the overlapping portions of the two lateral supports at the same side.

Optionally, the overlapping portion has two sections of plates which are offset in height, and a horizontal slot is defined between the two sections of plates, wherein an end of the baffle is provided with an insertion piece for insertedly engaging with the slot.

Optionally, the number of the anti-collapse member is at least one, and the anti-collapse members are sequentially arranged at intervals along a length direction of the baffle, and at least one anti-collapse member is close to the middle of the baffle.

Optionally, the anti-collapse member is configured as:
a tab connected with the baffle and extending into a bottom surface of the lamp panel; or
a supporting piece, the middle of which is rotatably connected to the baffle, wherein one end of the supporting piece is configured to be rotated to be supported on the bottom surface of the lamp panel, and the other end is provided with a toggling piece for driving the supporting piece to rotate; or
a connecting piece fixed on a top surface of the lamp panel, wherein one end of the connecting piece is fixed to the top surface of lamp panel through bolts, and the other end is bent and supported on the back plate Optionally, the lamp panel comprises a frame, a back plate and a diffusion plate mounted in the frame, light emitting elements disposed between the back plate and the diffusion plate, and a driving module electrically connected to the light emitting elements; and a gap is defined between at least one side edge of the frame and the edge of the lamp frame.

Optionally, the light emitting elements are arranged on the lower surface of the back plate; or
the light emitting elements are mounted in the frame and distributed on two opposite side edges of the lamp panel.

Optionally, the frame is formed by two longitudinal supporting plates and two transverse supporting plates, wherein each supporting plate has an L-shaped structure in a cross section and comprises a horizontal portion and a vertical portion, and wherein edges of the diffusion plate and the back plate overlap the horizontal portion, and a top edge of the vertical portion is higher than the edge of the back plate so as to cover the edge of the back plate.

Optionally, a corner of the frame is thickened to form a thickened portion, and a stepped structure is formed at the horizontal portion, wherein the horizontal portion has a first mounting surface and a second mounting surface which have different heights, and the first mounting surface is higher than the second mounting surface, and wherein the edge of the back plate overlaps the first mounting surface and is fixed by screws, and the edge of the diffusion plate overlaps the second mounting surface.

Optionally, the back plate is locally recessed against the edge of the diffusion plate, so that the diffusion plate is sandwiched and fixed between the back plate and the second mounting surface.

Optionally, a side of the back plate facing away from a light transmitting plate is protruded and comprises an edge region, a horizontal central region and an inclined transition region therebetween, wherein the edge region overlaps the frame, and the light emitting elements are disposed on the lower surface of the central region.

Optionally, the transition region has an upwardly extending flange which is connected with the edge region, so as to form a recessed region which extends along a length direction of the frame, and wherein a tip of the recessed region abuts against the diffusion plate.

Optionally, the lamp panel further comprises a power box for receiving the driving module, and wherein the power box is mounted on a top surface of the back plate.

The lamp panel of the lamp disclosed in the present application can be replaced, the size of which is slightly smaller than that of the lamp frame, and the gap is filled by the baffle, and the anti-collapse member is supported at the side edge of the lamp panel, so as to prevent the lamp panel from collapsing or deforming, with better versatility.

The other advantageous technical effects of the technical solution disclosed herein will be further explained in the specific embodiments.

100, lamp panel; 101, first side edge; 102, second side edge; 103, stud; 104, locking piece; 105, hook; 106, toggling piece; 111, frame; 112, longitudinal supporting plate; 113, transverse supporting plate, 114, horizontal portion; 115, vertical portion; 116, thickened portion; 117, first mounting surface; 118, second mounting surface, 119, screw groove; 121, back plate; 122, edge region; 123, central region; 124, transition region; 125, flange; 126, recessed region; 131, diffusion plate; 141, light emitting element; 142, circuit board; 143, LED bead; 144, lens; 151, power box; 152, tab piece; 200, lamp frame; 201, lateral support; 202, frame edge; 203, overlapping portion; 204, slot; 205, fixing hole; 2051, insertion end; 206, locking hole; 207, fixing portion; 300, gap; 301, baffle; 302, tab; 303, insertion piece; 304, connecting piece; 305, supporting piece; 306, toggling piece; 400, ceiling bracket; 500, lamp cover; 600, mounting chamber.

DESCRIPTION OF THE EMBODIMENTS

The technical solutions according to the embodiments of the present disclosure will be described apparently and completely below with reference to the drawings according to the embodiments of the present disclosure. Obviously, the described embodiments are illustrated as a part of the embodiments of the present disclosure, but not exhaustive. Based on the embodiments of the present disclosure, all other embodiments obtained by a person skilled in the art without inventive efforts fall within the protection scope of the present disclosure.

It should be noted that, when a component is "connected" with another component, it may be directly connected to another component or may be indirectly connected to another component through a further component. Similarly, when a component is "provided" on another component, it may be directly provided on another component or may be provided on another component through a further component.

Unless otherwise defined, all technical and scientific terms used herein have the same meaning as commonly understood by a person skilled in the art. The terms in the description of the present disclosure are used to describe specific embodiments, and not to limit the present disclosure. The terms "and/or" used herein are intended to include one or more of the correspondingly listed options.

Referring to FIGS. 1 to 9, an anti-collapse lamp includes a lamp panel 100 and a lamp frame 200. The lamp frame 200 defines an installation chamber 600 therein, and the lamp panel 100, as a light source, is provided in the installation chamber 600.

Figure 1:
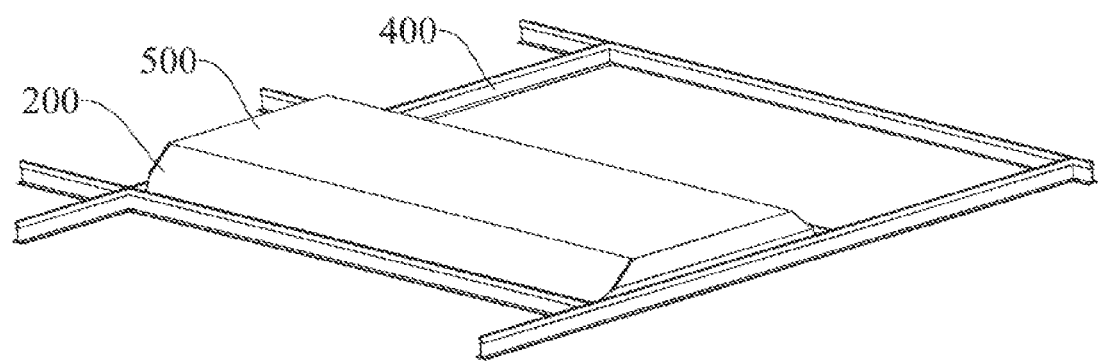
FIG. 1 is a schematic installation diagram of a lamp frame.
Figure 2:
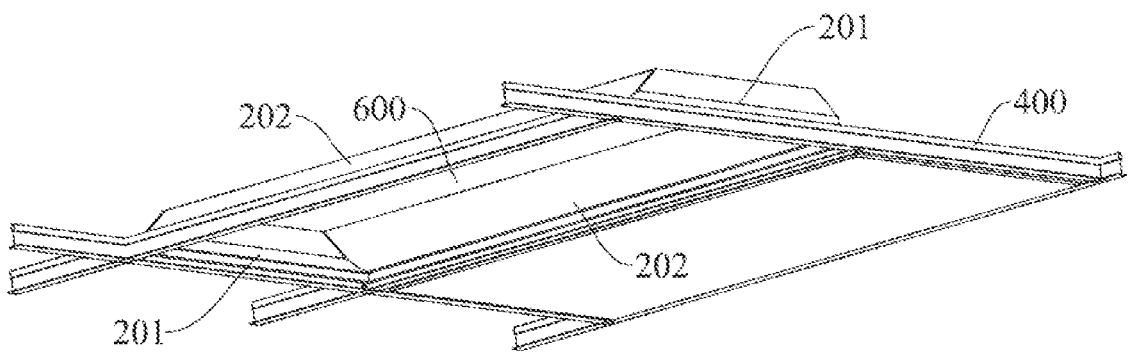
FIG. 2 is an internal schematic structural view of the lamp frame.

FIG. 1 and FIG. 2 show a schematic diagram of the lamp frame 200 mounted on a ceiling bracket 400, which is directly placed on the ceiling bracket 400, with the installation chamber 600 corresponding to the installation position for the lamp on the ceiling bracket 400. The lamp frame 200 has a lamp cover 500 at the top and the installation chamber 600 at the bottom. Preferably, the mounted lamp panel 100 keeps flush with the bottom surface of the ceiling bracket 400. The lamp frame 200 has a frame structure, such as a rectangular frame, and is formed by lateral supports 201 and frame edges 202.

A gap 300 is remained between at least one side of the lamp panel 100 and an edge of the installation chamber, and a baffle 301 is provided to shield the gap 300 and overlapped on the lamp frame 200. The baffle 301 is provided with an anti-collapse member supporting a corresponding side edge of the lamp panel 100.

The gap 300 provides an operating space for mounting the lamp panel 100 in the lamp frame 200, which facilitates the mounting of the lamp panel 100 in the lamp frame 200.

The size of the lamp panel 100 herein is slightly smaller than that of the installation chamber 600 in the lamp frame 200. The gap 300 between the lamp panel 100 and the lamp frame 200 is filled by the baffle 301, so that the lamp panel 100 and the lamp frame 200 are visually formed in one piece. Due to the gap 300, the side edge of the lamp panel 100 that is not connected with the lamp frame 200 is suspended. The baffle 301 is provided with the anti-collapse member for supporting the lamp panel 100, thereby preventing the lamp panel 100 from collapsing or deforming.

At least two side edges of the lamp panel 100 herein are fixed to the lamp frame 200, and the two side edges may be adjacent or opposite to each other. In the absence of a lamp panel 100 with proper size, a lamp panel 100 with smaller size may be selected, which may be adapted in length or width to the size of the lamp frame 200, and the gaps 300 on the other side edges may be filled by the baffles 301, to maintain the same lighting effect, with better versatility.

In another embodiment, the lamp panel 100 has two opposite first side edges 101 and two opposite second side edges 102, and the gap 300 is located between the first side edge 101 and the edge of the lamp frame 200 or between the second side edge 102 and the edge of the lamp frame 200.

Figure 3:
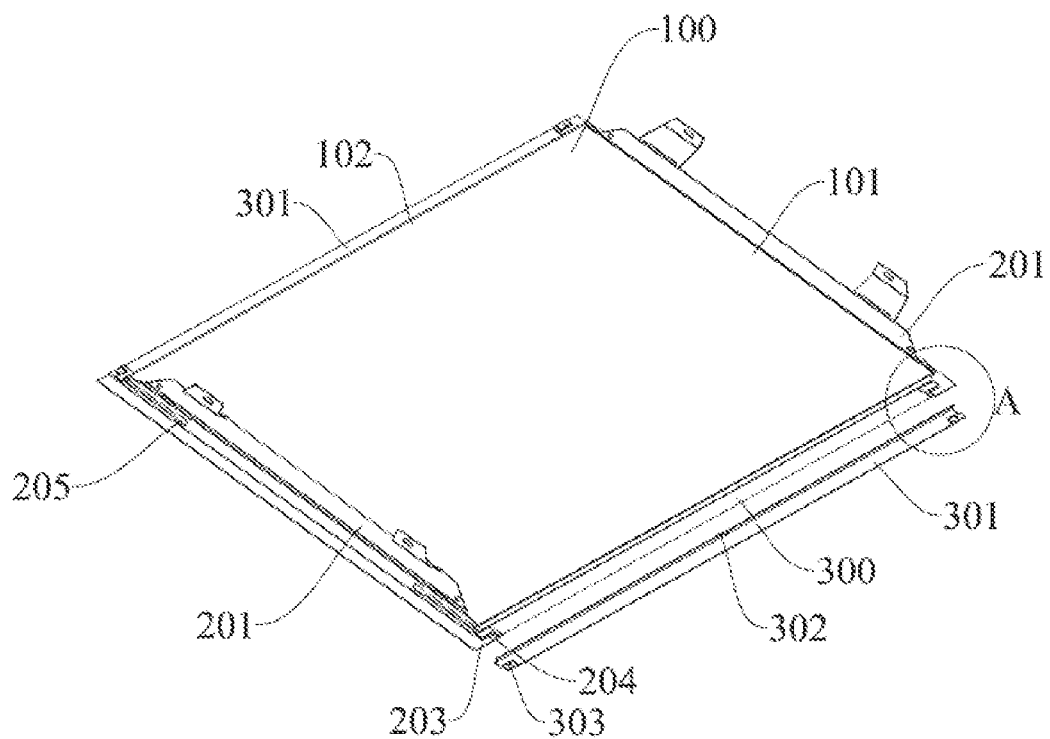
FIG. 3 is a first schematic structural view of the lamp panel and the lateral support.

As shown in FIG. 1, the dotted line represents the edge of the lamp frame 200. The two first side edges 101 of the lamp panel 100 are fixedly connected to the lamp frame 200, and gaps 300 are defined between the second side edges 102 and the edges of the lamp frame 200, and the baffles 301 are disposed at the gaps 300 for filling the gaps 300 on both side edges of the lamp panel 100. In FIG. 3, one of the baffles 301 is slightly displaced to show the position of the gap 300.

Figure 8:
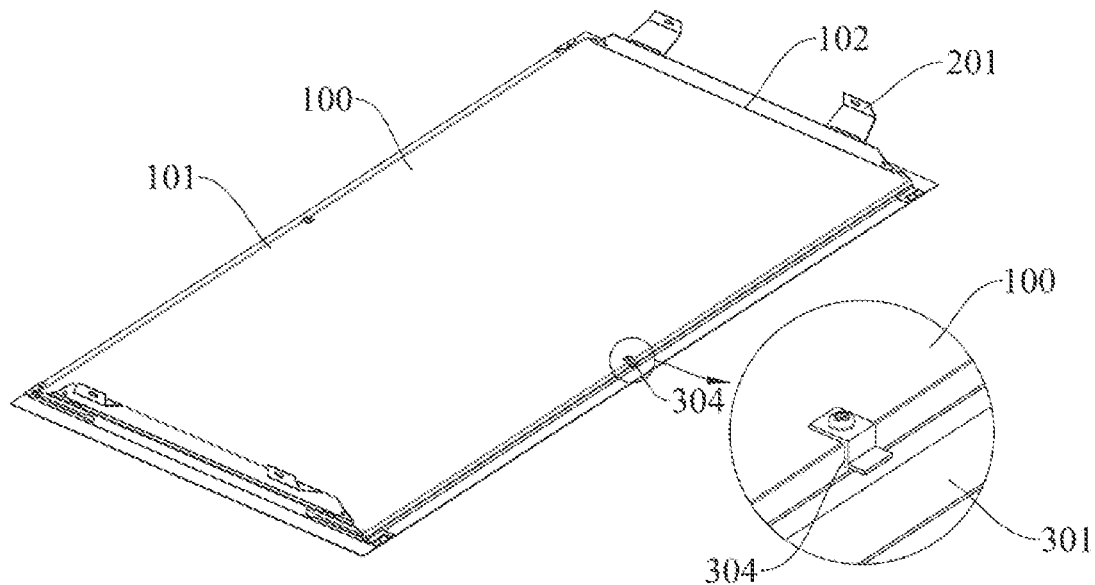
FIG. 8 is a second schematic structural diagram of the lamp panel and the lateral support.
Figure 9:
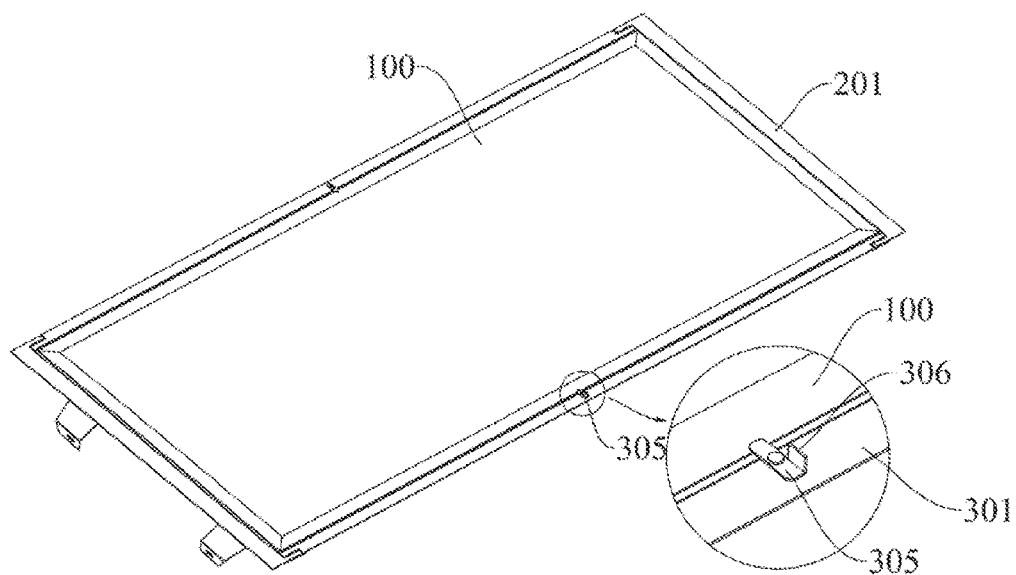
FIG. 9 is a third schematic structural diagram of the lamp panel and the lateral support.

A common lamp panel 100 has a square or rectangular shape. For the square lamp panel 100, no installation angle is required, and the side edges that are not directly fixed to the lamp frame 200 are supported by the baffles to prevent collapse. As shown in FIG. 8 and FIG. 9, for the rectangular lamp panel 100, the first side edge 101 in the length direction is longer than the second side edge 102 in the width direction, and if the second side edges 102 are fixed to the lamp frame 200, the first side edges 101 in the length direction would be more likely to collapse. Therefore, it is preferred to provide the anti-collapse members to support the first side edges 101.

In another embodiment, the lamp panel 100 is rectangular, with two first side edges 101 in the length direction and two second side edges 102 in the width direction. The gap 300 (shielded by the baffle 301) is located between at least one of the first side edges 101 and an edge of the installation chamber 600. The anti-collapse member on the baffle 301 supports the first side edge 101, to achieve a better anti-collapse effect.

In another embodiment, as shown in FIGS. 1 and 2, the lamp frame 200 includes two opposite lateral supports 201 and two opposite frame edges 202. As shown in FIG. 3, FIG. 8 and FIG. 9, only the installation diagram between the two lateral supports 201 and the lamp panel 100 is shown, with the frame edges 202 not shown. The side edges of the lamp panel 100 and the lateral supports 201 are provided with locking mechanisms for fixing the lamp panel 100, that is, the lamp panel 100 is installed and fixed within the lamp frame 200 through the two locking mechanisms, so that the gaps 300 are formed between the frame edges 202 and the side edges of the lamp panel 100.

In order to maintain the installed lamp panel 100 in a structurally stable state, the installed lamp panel 100 is fixed at at least two points. In one embodiment, the number of locking mechanism is at least one. The locking mechanisms are spaced between the lamp panel 100 and the lamp frame 200.

In this embodiment, the locking mechanism includes a first locking mechanism and a second locking mechanism, by means of which the lamp panel 100 is fixed within the lamp frame 200.

Figure 4:
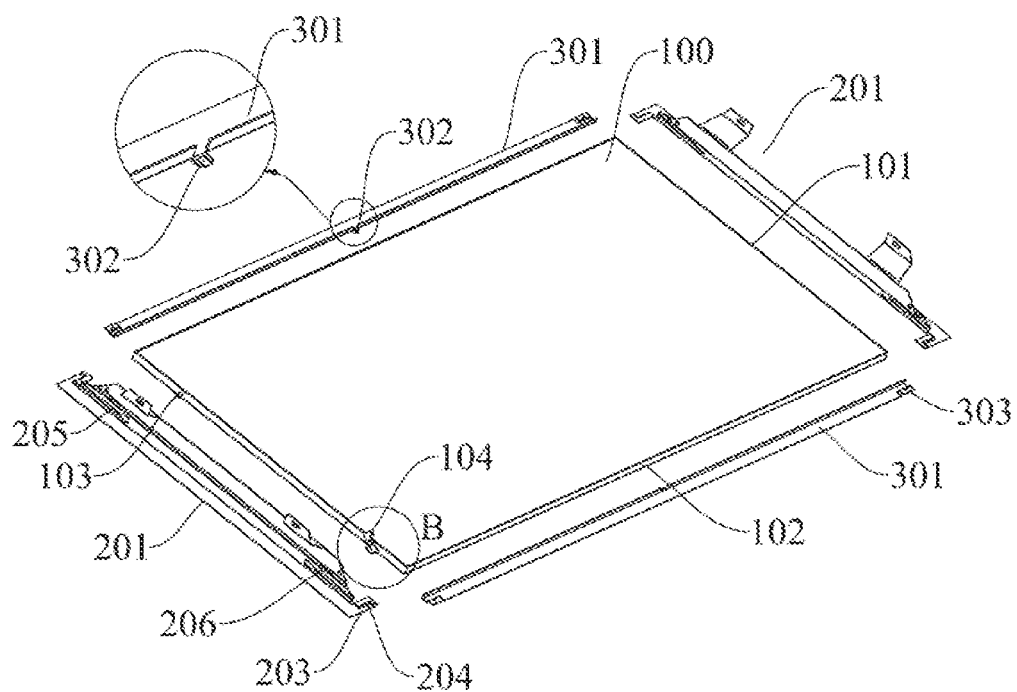
FIG. 4 is an exploded view of FIG. 3.
Figure 5:
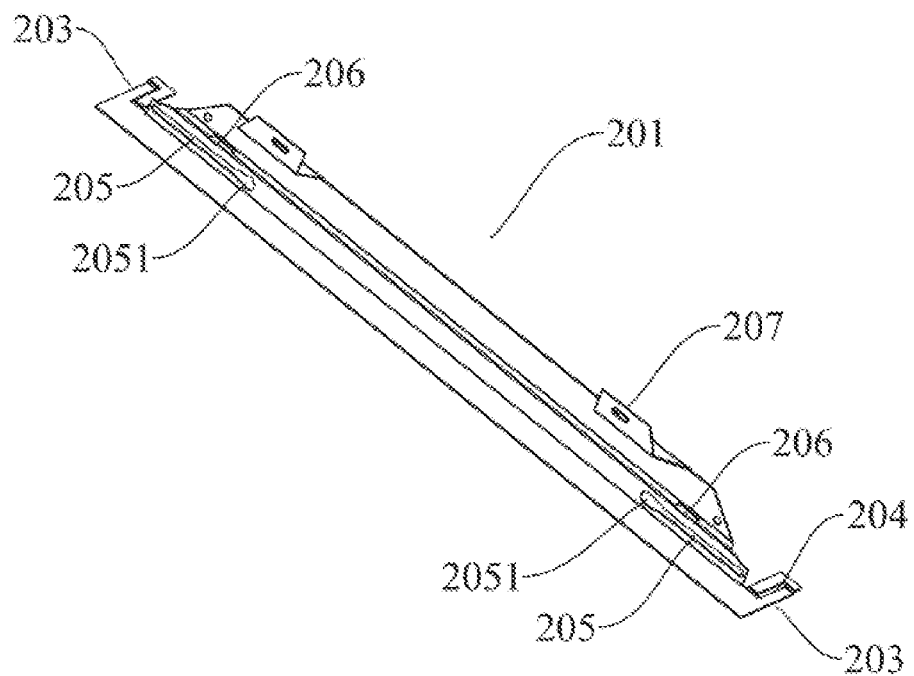
FIG. 5 is a schematic structural view of the lateral support.

In another embodiment, referring to FIGS. 4 and 5, the first locking mechanism includes:

a stud 103 mounted at the side edge of the lamp panel 100, wherein one end of the stud 103 facing away from the lamp panel 100 is provided with a stopping cap; and a fixing hole 205 with a straight extending path, wherein one end of the fixing hole 205 is enlarged in diameter to form an insertion end 2051 for the stopping cap passing through.

The stud 103 protrudes from the lamp panel 100 towards the side of the lateral support 201. The diameter of the stopping cap is larger than that of the stud 103. In other words, the stud 103 is of similar construction to a bolt with a cap. The stopping cap is inserted through the fixing hole 205 via the insertion end 2051, and the stud 103 is slid to the other end of the fixing hole 205, so that the stopping cap can prevent the withdrawal of the stud 103.

The above-mentioned enlarging in diameter refers to that the size of the insertion end 2051 is larger than that of the other portion of the fixing hole 205. Said size may be understood as width, diameter or length. The cap of the stud 103 can only pass through the insertion end 2051, and prevent the stud 103 from being withdrawn from the fixing hole 205 at the other portion.

In this embodiment, both opposite side edges of the lamp panel 100 are provided with studs 103, and fixing holes 205 are correspondingly defined on the lateral supports 201 on both sides. During the installation of the lamp panel, the studs 103 on both sides of the lamp panel are adjusted to pass through the fixing holes 205 via the insertion ends 2051, and then pushed to the other ends of the fixing holes 205, so that the lamp panel 100 is suspended on the lamp frame 200 by the two studs 103.

Figure 7:
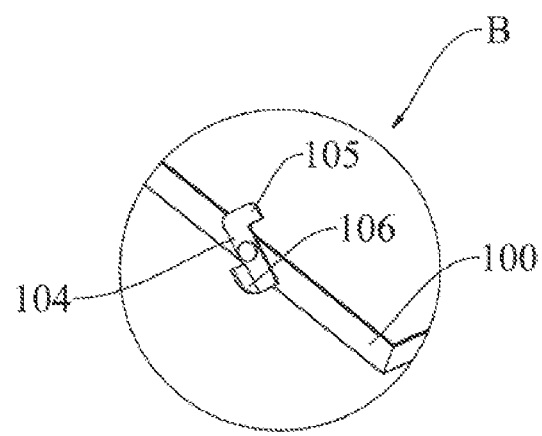
FIG. 7 is an enlarged view at B in FIG. 4.

In another embodiment, referring to FIGS. 4, 5 and 7, the second locking mechanism includes:

a locking hole 206 defined in the lateral support 201;

a locking piece 104 rotatably mounted on the side edge of the lamp panel 100, wherein the locking piece 104 has a length direction and is mounted at the middle thereof in the length direction on the side edge of the lamp panel 100 through a rotating shaft, and one end of the locking piece 104 in the length direction is provided with a hook 105 for extending into the locking hole 206 to be hooked and locked, and the other end is provided a toggling piece 106 for rotating the locking piece 104.

After the above-mentioned first locking mechanism is assembled, the locking piece 104 is turned so that the hook 105 at the end moves into the locking hole 206 in the lateral support 201, so as to fix the lamp panel in the lamp frame. When the locking piece 104 is rotated reversely, the lock will be released to allow the lamp panel to be replaced.

In another embodiment, referring to FIG. 5, there are two sets of fixing holes 205 and locking holes 206 provided at both ends of the lateral support 201, respectively. Therefore, the lamp panel 100 is arranged in the appropriate installation angle or direction as required so that the studs 103 on the lamp panel 100 can enter into the fixing holes 205 on either side.

In another embodiment, referring to FIGS. 1 and 2, the lamp frame 200 includes two opposite lateral supports 201 and two opposite frame edges 202.

In this embodiment, the lamp panel 100 is rectangular. Referring to FIGS. 8 and 9, the two frame edges 202 (not shown) correspond to the two first side edges 101 of the lamp panel 100 in the length direction, and the two lateral supports 201 correspond to the two second side edges 102 of the lamp panel 100 in the width direction. The gap 300 is defined between the first side edge 101 and the frame edge 202 at the same side therewith.

The baffle 301 in the present application is installed after the lamp panel 100 is installed in the lamp frame 200. In another embodiment, referring to FIG. 3, the two ends of the lateral support 201 are provided with overlapping portions 203 extending to the two second side edges, and both ends of the baffle 301 are respectively overlapped on the overlapping portions 203 of the two lateral supports at the same side at the positions for supporting the baffle 301.

Figure 6:
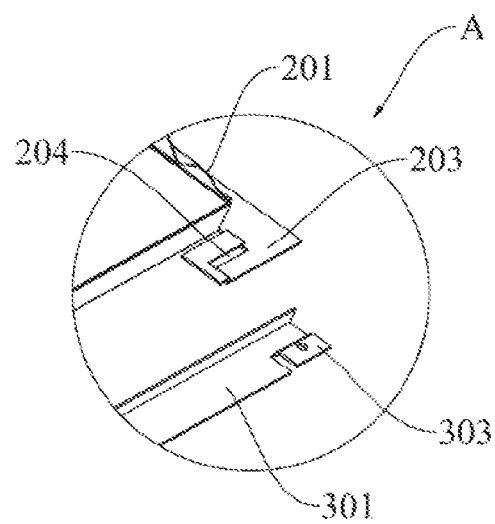
FIG. 6 is an enlarged view at A in FIG. 3.

In another embodiment, referring to FIGS. 3, 5 and 6, the overlapping portion 203 has two sections of plates that are offset in height, and a horizontal slot 204 is defined between them. The end of the baffle 301 is provided with an insertion piece 303 for insertedly engaging with the slot 204. That is, the overlapping portion 203 is stamped to form the two sections of plates which have different heights, with the gap between the sections of plates being the slot 204. The inserting direction is horizontal, and after the insertion piece 303 is inserted, the baffle 301 is installed and supported horizontally.

The overlapping portion 203 is stamped to form the two sections of plates which are offset in height, and a horizontal slot 204 is defined at the junction of the two sections of plates.

In order to maintain the installed lamp panel 100 in a structurally stable state, in one embodiment, the number of the anti-collapse members is at least one, and the anti-collapse members are sequentially spaced along the length of the baffle 301, and at least one of the anti-collapse members is close to the middle of the baffles 301.

In another embodiment, as shown in FIG. 4, that anti-collapse member may be configured as a tab 302 that is connected with the baffle 301 and extends into the bottom surface of the lamp panel 100. The tab 302 may be configured as a folded portion of the baffle 301, and can support the side edge of the lamp panel 100.

Surely, in other embodiments, the tab 302 may be fixed to the baffle 301 by welding, screwing, or the like.

In another embodiment, as shown in FIG. 8, the anti-collapse member is configured as a connecting piece 304 connected to the top surface of the lamp panel 100, one end of the connecting piece is fixed to the top surface of lamp panel 100 by a bolt, and the other end is bent and located on the top of the baffle 301. In other word, the baffle 301 lifts the side edge of the lamp panel 100 through the connecting piece 304.

Since there is a certain height difference between the top surface of the lamp panel 100 and the top of the baffle 301, the connecting piece 304 is self-bent so that it can extend from the lamp panel 100 to the baffle 301.

In another embodiment, as shown in FIG. 9, the anti-collapse member is configured as a supporting piece 305, the middle of which is rotatably connected with the baffle 301, wherein one end of the supporting piece 305 is rotated to support on the bottom surface of the lamp panel 100, and the other end is provided with a toggling piece 306 for driving the supporting piece 305 to rotate. After the baffle 301 is installed, the supporting piece 305 is rotated to support the lamp panel 100.

The anti-collapse members in the present application may be configured as one of the three structures mentioned above, or the anti-collapse members configured as two or more of the structures may be simultaneously used, which brings better technical effect.

In another embodiment, as shown in FIG. 5, the lateral support 201 of the lamp frame 200 is provided with a fixing portion 207 with a hole, so that the lamp frame 200 can be installed in a suspended way.

The installation process of the lamp herein includes the following: fixing the lamp panel 100 within the lamp frame 200, inserting the baffle 301 in the gap, and adjusting the anti-collapse member on the baffle 301 so that the anti-collapse member is lifted or supported on the side edge of the lamp panel 100.

The lamp panel 100 in this embodiment is a light source board, and is usually configured as an LED panel lamp. The main components of the lamp panel 100 include an aluminum frame for the panel lamp, an LED light source, a light guide plate, and a driving power source and the like.

In another embodiment, as shown in FIG. 10 to FIG. 19, the lamp panel 100 includes a frame 111, a back plate 121 and a diffusion plate 131 mounted in the frame 111, light emitting elements 141 disposed between the back plate 121 and the diffusion plate 131, and a driving module electrically connected to the light emitting elements 141;

A gap 300 is defined between at least one side edge of the frame 111 and an edge of the lamp frame 200.

Figure 19:
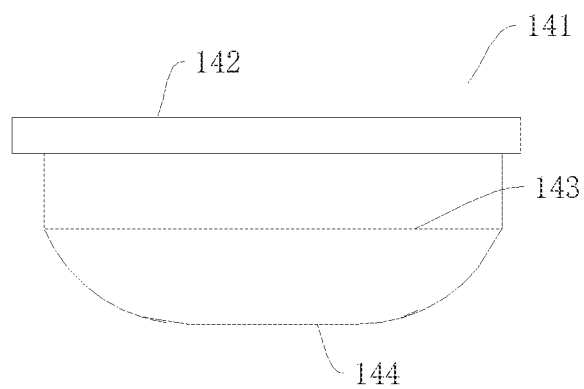
FIG. 19 is a schematic structural view of the light emitting element as shown in FIG. 11.

As shown in FIG. 19, the light emitting element 141 includes a circuit board 142, LED beads 143 fixed on the circuit board 142, and lenses 144 covering the LED beads 143. The light emitted from the LED bead 143 sequentially passes through the lens 144 and the diffusion plate 131. After the light is diffused, a plurality of LED point light sources form a uniform surface light source.

The circuit board 142 may be a metal substrate, preferably, an aluminum substrate, or an FR-4 glass fiber board. Preferably, it is fixed to the lower surface of the back plate 121 by bonding through thermal conductive adhesive.

In another embodiment, as shown in FIG. 10 to FIG. 14, in the present embodiment, the light emitting elements 141 are disposed on the lower surface of the back plate 121, and the circuit board 142 of the light emitting element 141 is fixed to the bottom surface of the back plate 121 by screws.

Alternatively, in other embodiments, the light emitting elements 141 are mounted on the inner side of the frame 111, and are distributed on opposite side edges of the lamp panel 100 in order to allow the lamp panel 100 to emit light uniformly.

Figure 11:
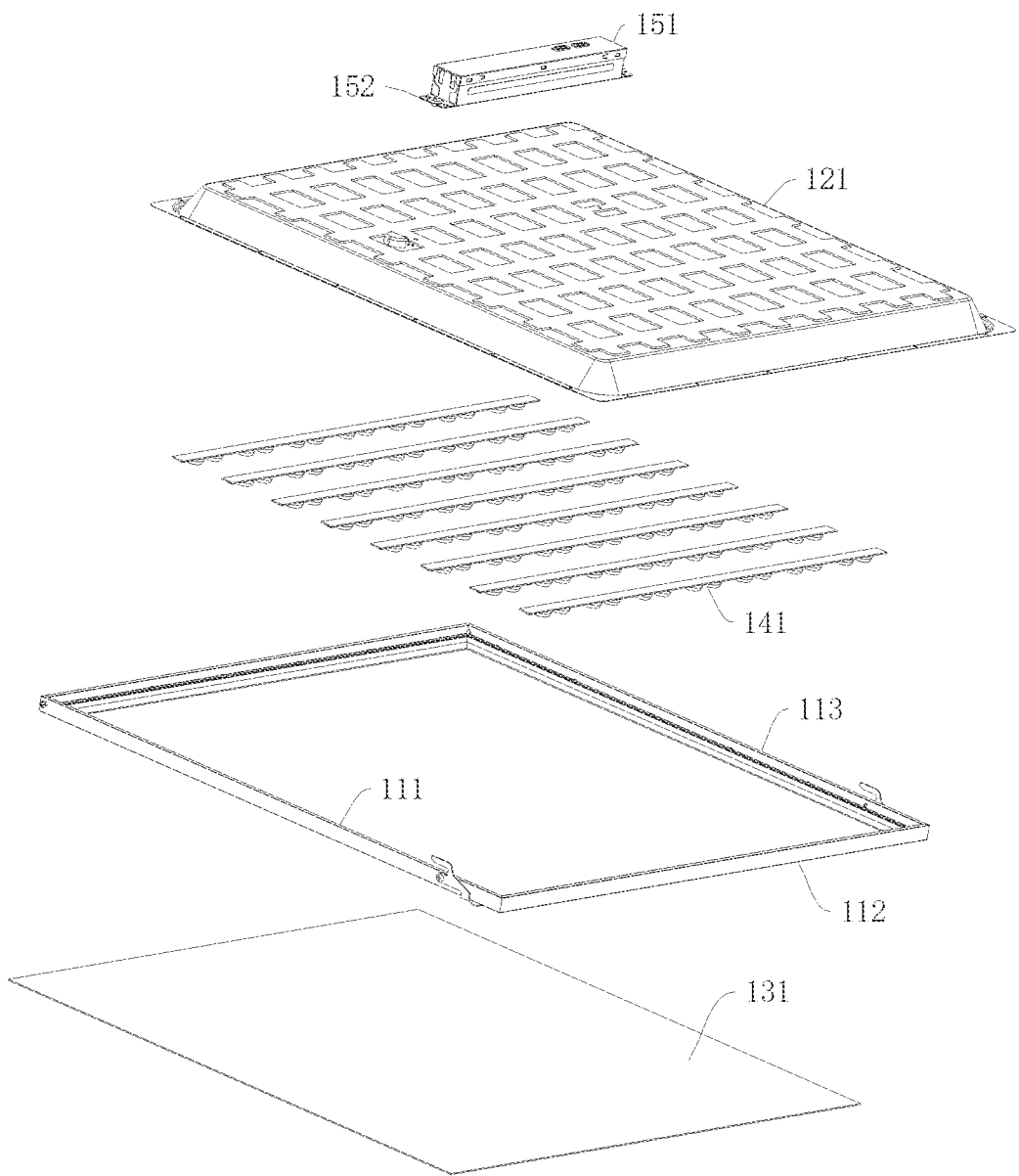
FIG. 11 is an exploded view of the lamp panel as shown in FIG. 10.
Figure 12:
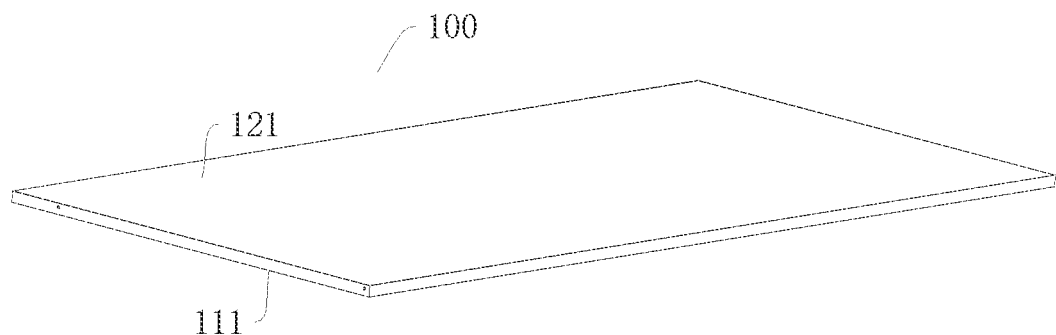
FIG. 12 is a schematic structural view of another embodiment of the lamp panel as shown in FIG. 1.
Figure 13:
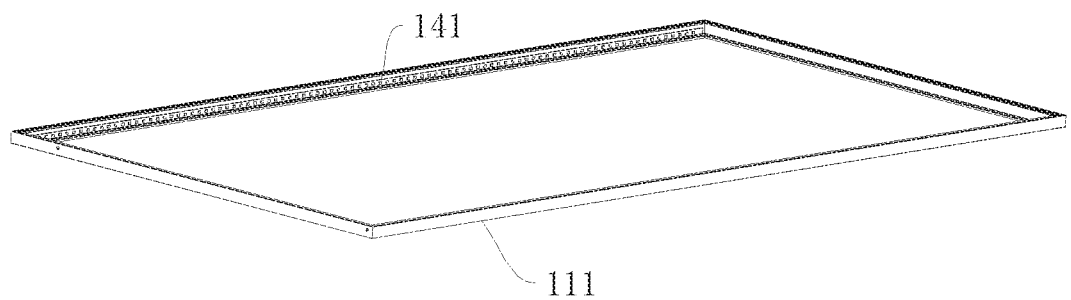
FIG. 13 is a schematic structural view of the lamp panel as shown in FIG. 12, with the back plate and the diffusion plate not shown.

In another embodiment, as shown in FIGS. 11 and 13, the frame 111 is formed by two longitudinal supporting plates 112 and two transverse supporting plates 113. The supporting plates are made of metal profile (such as aluminum alloy), and the ends of adjacent supporting plates are fixed by welding. Alternatively, the supporting plates may also be made of polymer material by injection molding. Since the polymer material cannot be welded, it is generally necessary to provide corner pieces at the corners of the frame 111 to connect the adjacent supporting plates. Alternatively, the adjacent supporting plates are connected by overlapping, but the flatness of the resulted frame in this way is poor relative to that of the resulted frame by welding.

Figure 14:
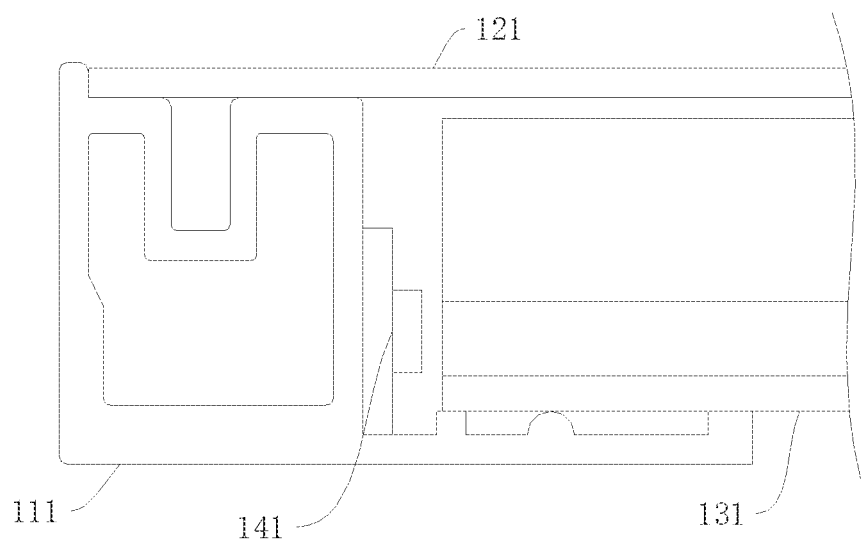
FIG. 14 is a schematic structural view of the lamp panel as shown in FIG. 12, with a supporting plate not shown.
Figure 15:
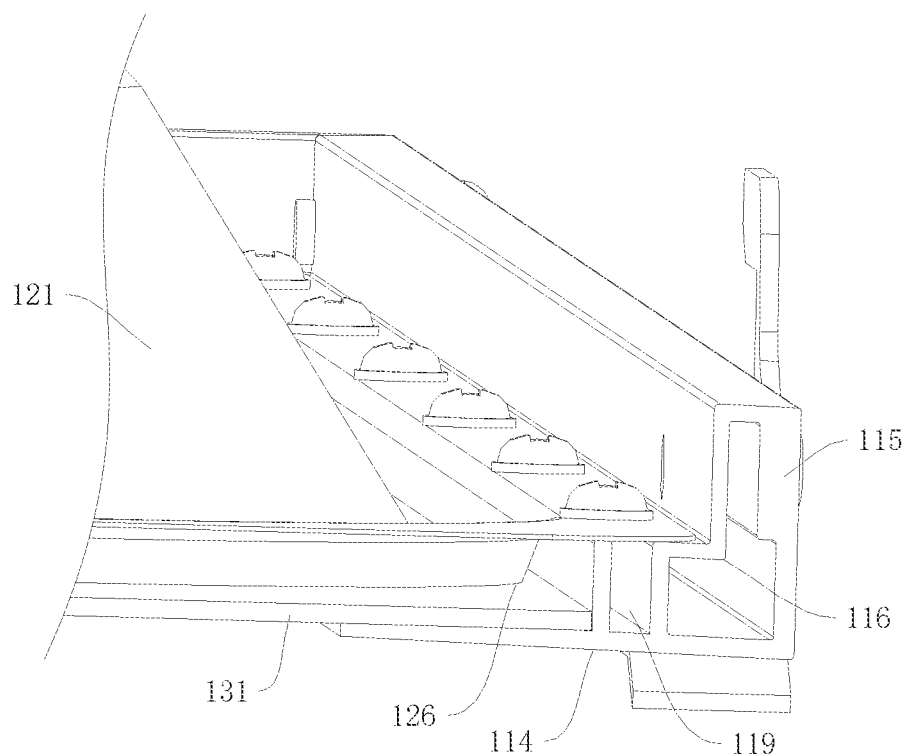
FIG. 15 is a partial view of the lamp panel as shown in FIG. 10, with the supporting plate not shown.
Figure 16:
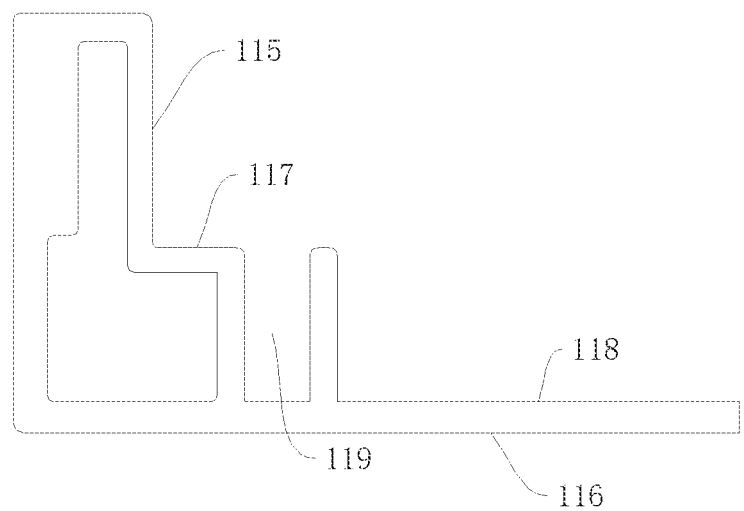
FIG. 16 is a schematic structural view of the supporting plate as shown in FIG. 10.

In another embodiment, as shown in FIGS. 14 to 16, each of the supporting plates has an L-shaped structure in the cross section, including a horizontal portion 114 and a vertical portion 115. The edges of the diffusion plate 131 and the back plate 121 overlap on the horizontal portion 114, and the top edge of the vertical portion 115 is higher than the edge of the back plate 121, so as to cover the edge of the back plate for decoration and protection.

In another embodiment, in order to increase the strength of the profile, the corner of the frame 111 is internally thickened to form a thickened portion 116, and a stepped structure is formed at the horizontal portion 114 so that the horizontal portion 114 has a first mounting surface 117 and a second mounting surface 118 which have different heights, wherein the first mounting surface 117 is higher than the second mounting surface 118. The edge of the back plate 121 overlaps on the first mounting surface 117 and fixed by screws, and the edge of the diffusion plate 131 overlaps on the second mounting surface 118.

In order to save material, in an embodiment, the thickened portion 116 has a hollow structure.

In another embodiment, as shown in FIG. 15, the back plate 121 is partially recessed against the edge of the diffusion plate 131, so that the diffusion plate 131 is sandwiched and fixed between the back plate 121 and the second mounting surface 118, to prevent the middle portion of the diffusing plate 131 from being recessed downward.

Figure 17:
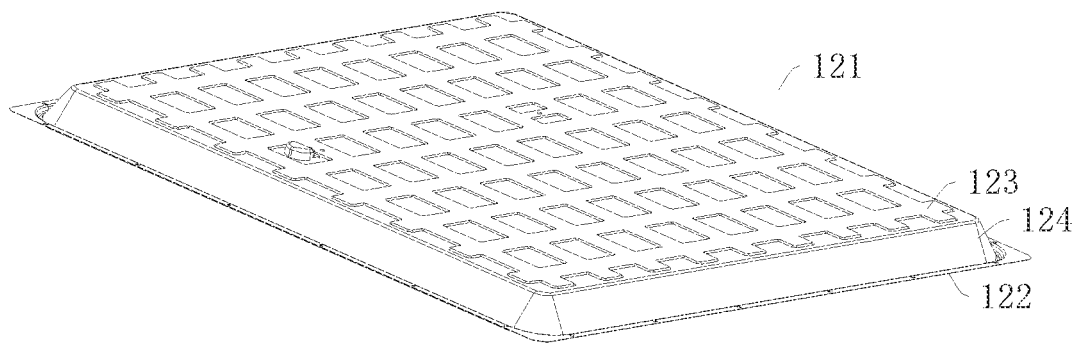
FIG. 17 is a schematic structural view of the back plate as shown in FIG. 10.
Figure 18:
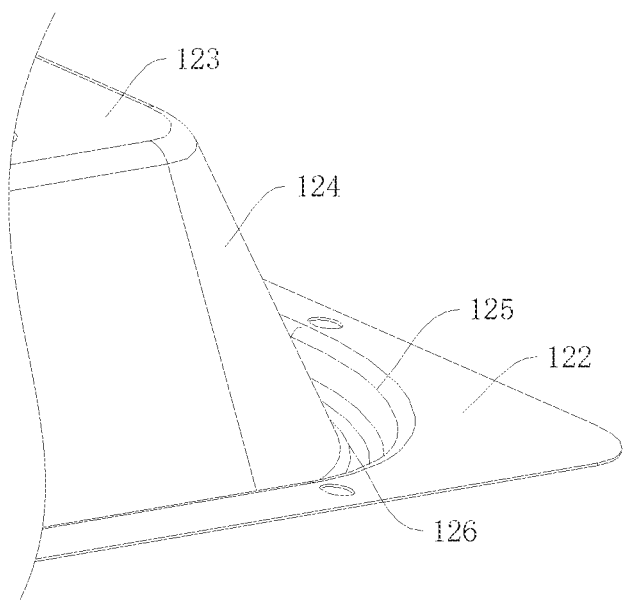
FIG. 18 is a partial schematic view of the back plate as shown in FIG. 17.

Considering the processing process and the heat dissipation, in one embodiment, as shown in FIG. 17 and FIG. 18, the back plate 121 is formed by stamping from a metal plate material, so that the side of the back plate 121 away from the light transmitting plate is protruded. The back plate 121 includes an edge region 122 overlapping on the frame 111, a horizontal central region 123, and an inclined transition region 124 therebetween, wherein the light emitting elements 141 are disposed on the lower surface of the central region 123.

In order to fix the diffusion plate 131 tightly, in one embodiment, the transition region 124 has an upwardly extending flange 125 that is connected with the edge region 122, thereby forming a recessed region 126 extending along the length of the frame 111. The tip of the recessed region 126 abuts against the diffusion plate 131 to fix the diffusion plates 131. Given the back plate 121 has a certain elasticity, when the recessed region 126 abuts against the diffusion plate 131, the portion of the back plate 121 connected with the edge region 122 will be elastically deformed, so that the tip can apply pressure to the diffusion plate 131.

In another embodiment, the edge region 122 of the back plate 121 is fixed to the frame by fastening screws. For ease of mounting, the first mounting surface 117 is provided with a screw groove 119 extending along the length of the frame 111, and the edge of the back plate 121 is screwed to the screw groove 119 by a bolt.

Figure 10:
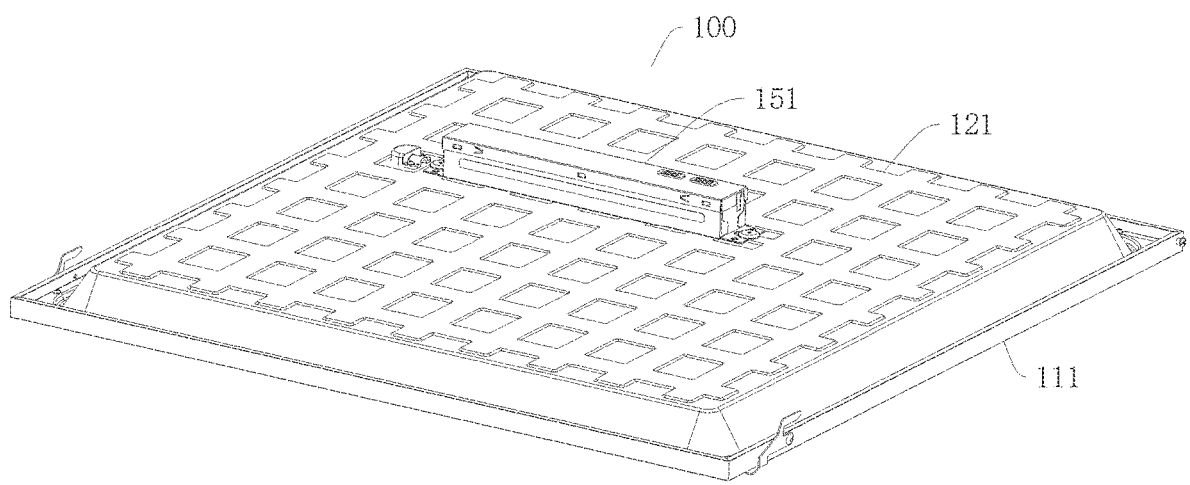
FIG. 10 is a schematic structural view of the lamp panel as shown in FIG. 1.

To fix and protect the driving module, in one embodiment, as shown in FIG. 10 and FIG. 11, the lamp panel 100 further includes a power box 151 for receiving the driving module. The power box 151 is mounted on the top surface of the back plate 121.

For the assembling form between the power box 151 and the back plate 121, in one embodiment, as shown in FIG. 10 and FIG. 11, two ends of the power box 151 are provided with tab pieces 152 fixed to the back plate 121 by fasteners. The fastener sequentially passes through the tab piece 152 and the back plate 121 to fix the power box 151 to the back plate 121. The bottom surface of the tab piece 152 is flush with the bottom of the power box 151, and the tab piece 152 has a screw hole for the fastener passing through.

In order to simply the manufacturing process between the tab pieces 152 and the power box 151, as well as to enhance the structural strength between the tab pieces 152 and the power box 151, the tab pieces 152 and the power box 151 are formed in one piece.

The technical features of the above embodiments can be combined arbitrarily. To make the description concise, all possible combinations of the technical features in the above embodiments are not described. However, as long as there is no contradiction in the combination of these technical features, it should be regarded as within the scope of this specification. When the technical features of different embodiments are reflected in the same drawing, it can be regarded that the drawing also discloses the combination examples of the various embodiments involved.

The above examples only express several implementations of the application, and the descriptions are more specific and detailed, but they should not be interpreted as a limitation on the scope of the patent application. It should be pointed out that for those of ordinary skill in the art, without departing from the concept of this application, several modifications and improvements can be made, and these all fall within the protection scope of this application. Therefore, the protection scope of this application shall be subject to the appended claims.

What is claimed is:

1. A collapse preventing lamp, comprising a lamp panel and a lamp frame, wherein the lamp panel as a light source is installed in the lamp frame, and wherein a gap is defined between at least one side edge of the lamp panel and an edge of the lamp frame; and a baffle for shielding the gap is provided which is overlapped on the lamp frame, and the baffle is provided with an anti-collapse member for supporting a corresponding side edge of the lamp panel;
   wherein the lamp frame is formed by two lateral supports arranged opposite to each other and two frame edges arranged opposite to each other; and wherein the side edge of the lamp panel and the lateral supports are provided with a locking mechanism for fixing the lamp panel; and the gap is located between at least one of the frame edges and the side edge of the lamp panel; and
   wherein the locking mechanism comprises:
   a locking hole defined in the lateral supports; and
   a locking piece rotatably mounted at the side edge of the lamp panel, wherein the locking piece has a length direction, and the locking piece is mounted at a middle thereof in the length direction at the side edge of the lamp panel through a rotating shaft, and wherein one end of the locking piece in the length direction is provided with a hook extending into the locking hole to be hooked, and the other end is provided with a toggling piece for rotating the locking piece.

2. The collapse preventing lamp according to claim 1, wherein the lamp panel has two opposite first side edges and two opposite second side edges, wherein the gap is located between the first side edge and the edge of the lamp frame or between the second side and the edge of the lamp frame.

3. The collapse preventing lamp according to claim 2, wherein the lamp panel has the two first side edges located in a longitudinal direction and the two second side edges located in a width direction, and wherein the gap is located between at least one of the first side edges and the edge of the lamp frame.

4. The collapse preventing lamp according to claim 1, wherein the number of the locking mechanism is at least one, and the locking mechanisms are spaced between the lamp panel and the lamp frame.

5. The collapse preventing lamp according to claim 1, wherein the locking mechanism comprises:
   a stud mounted at the side edge of the lamp panel, wherein an end of the stud facing away from the lamp panel is provided with a stopping cap; and
   a fixing hole opened in the lateral supports, wherein the fixing hole extends in a straight line, and one end of the fixing hole is enlarged in diameter to form an insertion end for the stopping cap passing through.

6. The collapse preventing lamp according to claim 1, wherein the lamp frame comprises two lateral supports arranged opposite to each other, and two frame edges arranged opposite to each other; and wherein
   the two frame edges correspond to two first side edges of the lamp panel in a longitudinal direction in position, and the two lateral supports correspond to two second side edges of the lamp panel in a width direction in position; and
   the gap is located between the first side edge and the frame edge on the same side therewith.

7. The collapse preventing lamp according to claim 6, wherein both ends of the lateral supports are provided with overlapping portions extending to the first side edge, and two ends of the baffle are respectively overlapped on the overlapping portions of the two lateral supports at the same side.

8. The collapse preventing lamp according to claim 7, wherein the overlapping portion has two sections of plates which are offset in height, and a horizontal slot is defined between the two sections of plates, wherein an end of the baffle is provided with an insertion piece for insertedly engaging with the slot.

9. The collapse preventing lamp according to claim 1, wherein the number of the anti-collapse member is at least one, and the anti-collapse members are sequentially arranged at intervals along a length direction of the baffle, and at least one anti-collapse member is close to the middle of the baffle.

10. The collapse preventing lamp according to claim 1, wherein the anti-collapse member is configured as:
    a tab connected with the baffle and extending into a bottom surface of the lamp panel; or
    a supporting piece, the middle of which is rotatably connected to the baffle, wherein one end of the supporting piece is configured to be rotated to be supported on the bottom surface of the lamp panel, and the other end is provided with a toggling piece for driving the supporting piece to rotate; or
    a connecting piece fixed on a top surface of the lamp panel, wherein one end of the connecting piece is fixed to the top surface of lamp panel through bolts, and the other end is bent and supported on the back plate.

11. The collapse preventing lamp according to claim 1, wherein the lamp panel comprises a frame, a back plate and a diffusion plate mounted in the frame, light emitting elements disposed between the back plate and the diffusion plate, and a driving module electrically connected to the light emitting elements; and
    a gap is defined between at least one side edge of the frame and the edge of the lamp frame.

12. The collapse preventing lamp according to claim 11, wherein the light emitting elements are arranged on the lower surface of the back plate; or
    the light emitting elements are mounted in the frame and distributed on two opposite side edges of the lamp panel.

13. The collapse preventing lamp according to claim 11, wherein the frame is formed by two longitudinal supporting plates and two transverse supporting plates, wherein each supporting plate has an L-shaped structure in a cross section and comprises a horizontal portion and a vertical portion, and wherein edges of the diffusion plate and the back plate overlap the horizontal portion, and a top edge of the vertical portion is higher than the edge of the back plate so as to cover the edge of the back plate.

14. The collapse preventing lamp according to claim 13, wherein a corner of the frame is thickened to form a thickened portion, and a stepped structure is formed at the horizontal portion, wherein the horizontal portion has a first mounting surface and a second mounting surface which have different heights, and the first mounting surface is higher than the second mounting surface, and wherein the edge of the back plate overlaps the first mounting surface and is fixed by screws, and the edge of the diffusion plate overlaps the second mounting surface.

15. The collapse preventing lamp according to claim 14, wherein the back plate is locally recessed against the edge of the diffusion plate, so that the diffusion plate is sandwiched and fixed between the back plate and the second mounting surface.

16. The collapse preventing lamp according to claim 15, wherein a side of the back plate facing away from a light transmitting plate is protruded and comprises an edge region, a horizontal central region and an inclined transition region therebetween, wherein the edge region overlaps the frame, and the light emitting elements are disposed on the lower surface of the central region.

17. The collapse preventing lamp according to claim 16, wherein the transition region has an upwardly extending flange which is connected with the edge region, so as to form a recessed region which extends along a length direction of the frame, and wherein a tip of the recessed region abuts against the diffusion plate.

18. The collapse preventing lamp according to claim 11, wherein the lamp panel further comprises a power box for receiving the driving module, and wherein the power box is mounted on a top surface of the back plate.

\* \* \* \* \*